(No Model.)
J. H. NOLAN.
WEIGHING APPARATUS.
No. 403,692. Patented May 21 1889.
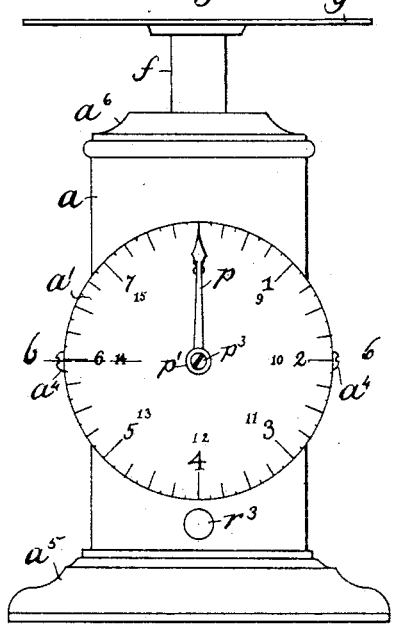
Fig. 1.
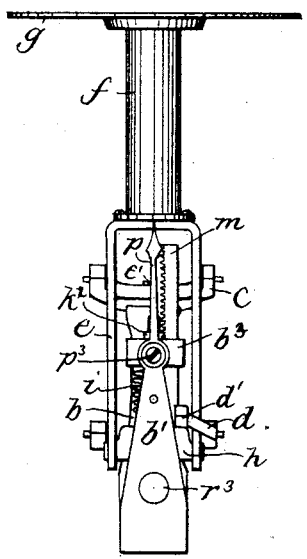
Fig. 2.
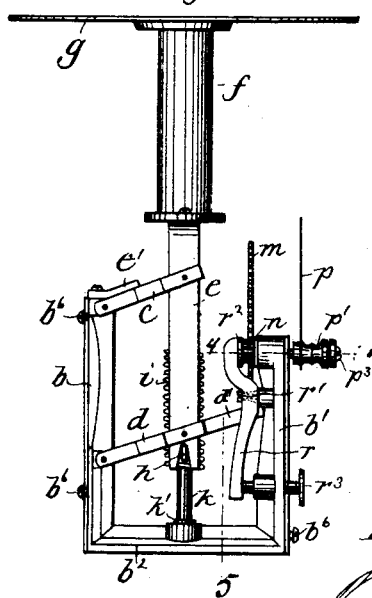
Fig. 3.
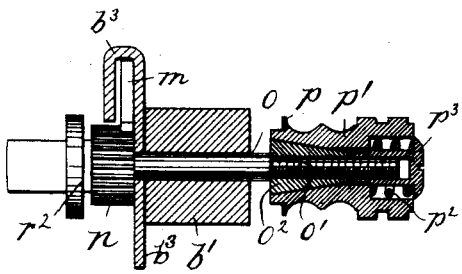
Fig. 4.
Fig. 5.
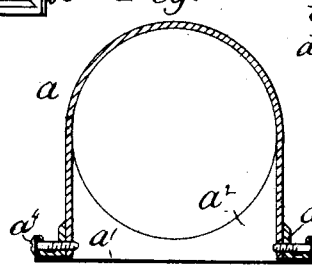
Fig. 6.
Witnesses.
M. E. Coll.
H. P. Livermore
Inventor,
John H. Nolan
by Jos. P. Livermore
Att'y.

UNITED STATES PATENT OFFICE.

JOHN H. NOLAN, OF BOSTON, MASSACHUSETTS.

WEIGHING APPARATUS.

SPECIFICATION forming part of Letters Patent No. 403,692, dated May 21, 1889.

Application filed July 23, 1888. Serial No. 280,723. (No model.)

*To all whom it may concern:*

Be it known that I, JOHN H. NOLAN, of Boston, county of Suffolk, and State of Massachusetts, have invented an Improvement in Weighing Apparatus, of which the following description, in connection with the accompanying drawings, is a specification, like letters on the drawings representing like parts.

My invention relates to a weighing apparatus or spring-balance, the object of the invention being to simplify the construction of the apparatus, so that it may be made at moderate expense, and also to provide means for changing the position of the weight indicator or pointer, so that several different weights may be successively added to the scale-pan or receiver and each weight indicated independently of the amount already in the receiver without computation of any kind on the part of the person using the apparatus. The scale-pan or weight-receiver is supported on a frame that is itself supported on a spring and connected with a rack that engages a pinion on an arbor that carries the pointer that co-operates with the indicating-dial of the apparatus. The said pointer is frictionally connected with its arbor, and a locking device is provided for the arbor, so that it may be locked and the pointer turned to any required position—as, for example, to the zero-point on the dial. Then if, for example, different amounts of several different ingredients are to be weighed out into one receptacle, the receptacle may be first placed on the scale-pan, and its weight will cause the pointer to move, and when the spring has come to rest the pointer-arbor may be locked and the pointer turned back to the zero-point and the pointer-arbor then released, so that the reading of the pointer will then correspond to the weight of the articles placed in the receptacle, and no computation will be necessary, as is the case in instruments of this kind as usually constructed. After the required weight of one article has been weighed out, the pointer-arbor may again be locked, the pointer again turned to the zero position, and its arbor again released, when the scale will be ready to indicate the weight of the material next added, just as if there were no other weights applied to the scale-pan; and such operations may be repeated up to the full capacity of the scale, and by turning the pointer back to the zero-point after the last article has been weighed, the backward movement of the pointer that takes place when the weight is removed from its receiver will indicate the sum of all the weights that have been placed on the receiver.

Figure 1 is a front elevation of a weighing apparatus embodying this invention; Fig. 2, a front elevation of the operative parts removed from the inclosing-case; Fig. 3, a side elevation of the operative parts; Fig. 4, an enlarged sectional detail on line 4, Fig. 3; Fig. 5, a sectional detail on line 5, Fig. 3; and Fig. 6, a sectional detail on line 6 of Fig. 1.

The operative parts of the scale are inclosed in a case or shell, $a$, provided with a suitable graduated dial, $a'$; but the parts are all connected with and supported on frame-work that is independent of the said case or shell $a$, so that the parts may be put together and tested before being inclosed in the said shell, and the frame and operative parts may be removed from the said case or shell and replaced by others, if desired. The said frame that supports the operative parts has a general shape like the letter U, as best shown in Fig. 3, consisting of two uprights, $b\ b'$, connected at their lower end by a horizontal portion, $b^2$. Upon the said upright $b$ are pivoted two levers, $c\ d$, each of which is branched or forked, as shown in Fig. 2, and receives within its two branches the weight-supporting standard or upright $e$, which is itself made as an open or inverted-U-shaped frame. The said standard $e$ is thus guided and retained in vertical position in its up-and-down movement by the levers $c\ d$, and it has supported upon it a post, $f$, provided with a scale-pan or receiver, $g$, which may be of any suitable or usual size and shape.

A stop, $e'$, upon the frame $b$ limits the upward movement of the weight-supporting frame $e$, the lower end of which is notched and rests upon the extremities of a yoke or cross-piece, $h$, (best shown in Figs. 3 and 5,) which engages three or four turns near the lower end of the coiled spring $i$, that supports the weight and balances the same by its elastic force, and by its elongation affords a means for measurement of the amount of the weight, as is usual in spring-balances. The upper end of the said spring $i$ is supported on an upright or stout rod, $k$, itself secured in the horizontal base portion $b^2$ of the frame and made adjustable therein by a screw-thread, as shown in Fig. 5, being fastened when at the proper height by a nut, $k'$. The said upright passes through the coil of the spring $i$, which rests on a top piece, $k^2$, that is swiveled on the upright $k$, so that the latter may be turned for the purpose of adjusting the tension of the spring without twisting the said spring.

In order to provide means for readily indicating the elongation of the spring, and thus indicating the amount of weight applied to the receiver $g$, the lever $d$ is extended beyond its pivotal connection with the frame $e$, as shown at $d'$, and is pivotally connected with a rack or toothed bar, $m$, that meshes with a pinion, $n$, on an arbor, $o$, having a bearing in the front upright, $b'$, of the main frame. The said rack is guided and retained in engagement with the pinion by a guide, $b^3$, that embraces it at a point opposite the pinion, as best shown in Figs. 2 and 4. The said arbor $o$ has frictionally connected with it a pointer, $p$, which thus accompanies the arbor in its rotary movement, except when positively turned upon the said arbor.

The construction of the frictional connection is best shown in Fig. 4. The outer end of the arbor $o$ is screw-threaded, as shown at $o'$, and has a conical or tapering sleeve, $o^2$, screwed tightly upon it. The pointer $p$ is connected with a hub, $p'$, having a tapering socket that fits upon the sleeve $o^2$, against which the hub $p$ is pressed by a spring, $p^2$, contained in a recess in its outer end and bearing against the head of a screw, $p^3$, which is hollow and has an internal thread that screws upon the threaded portion $o'$ of the arbor. The hub $p'$ is milled, so that it can be readily taken hold of by the fingers and turned. By this construction the pointer may be readily set at the zero position on the dial whatever may be the position of the weight-receiver $g$, and in order to prevent disturbance of the condition of the equilibrium of the spring $i$ when the pointer is thus being turned a locking device or clamp for the pointer-arbor is provided, being shown in this instance as a lever, $r$, fulcrumed at $r'$ on the upright $b'$ of the frame, and having one arm provided with a face or jaw, $r^2$, that may engage the end of the pinion $n$, tightly clamping the same against the face of the upright $b'$, or of the guide-piece $b^3$ connected therewith, as will be readily understood from Figs. 3 and 4. The other end of the lever $r$ is acted upon by an operating device, $r^3$, shown as a screw working in a threaded socket in the upright $b'$ and having a milled head which extends out through the case $a$, as shown in Fig. 1. The purpose of this clamp for the pointer-arbor and of making the pointer adjustable on its arbor may be best understood by describing the mode of operation for which the apparatus is especially intended.

If, for example, it is required to weigh definite amounts of different articles or ingredients into one receptacle—as, for example, to weigh successively a portion of flour, and then of butter, and then of sugar into a plate or bowl—the said receptacle may first be placed on the scale-pan $g$, and, without necessity of observing its weight at all, the pointer-arbor may be clamped and the pointer turned to the zero position. Then the desired amount of the first article—for example, one pound of flour—may be weighed, the pointer indicating the actual weight of the said article as if no receptacle were supported on the weighing apparatus. The pointer-arbor may then again be clamped, the pointer turned back to zero, and the desired weight of the next article added, the pointer again indicating the exact weight, and so on until the maximum capacity of the weighing apparatus is reached. In this way the confusion and mistakes are avoided which frequently arise when weighing apparatus having a movable indicator is used in the ordinary manner, as in the use of such apparatus as commonly made the weight of the receptacle, which might be any amount, not necessarily even units—as, for example, one pound and thirteen ounces—will first have to be observed and then added to the weight required for the first material in order to find the point to be indicated, when the required amount of the first material is added, after which another addition would have to be made to find the reading for the next material, and so on.

By making the frame-work that supports the operative parts independent of the outer shell or case, as previously described, scales of different capacity may be easily used having cases of the same size. It may, however, be desirable with a scale of large capacity to make the dial $a'$ of larger diameter than for a scale of smaller capacity.

The shell $a$ is mainly cylindrical in shape and has a lateral cylindrical projection, $a^2$, a portion of which is shown in Fig. 6, which receives the dial $a'$. This lateral projection is of the same diameter as the main upright cylinder and is of sufficient size for the dials of scales of smaller capacity, which dials may be fitted directly upon the said projection. For a scale of larger capacity the said lateral projection $a^2$ is provided with an enlarging ring, $a^3$, (see Fig. 6,) upon which the dial is secured, thus making said dial of larger diameter than the main cylinder $a$, as shown in Fig. 1. The said dial may be made of sheet metal having a flange turned up around its end, which flange engages the ring $a^2$, as shown in Fig. 6, said flange and ring being both secured upon the cylindrical projection $a^2$ by two or more screws, $a^4$. The cylindrical body $a$ of the case has an enlarged base or foot, $a^5$, which may be of ornamental design, and a cap-piece, $a^6$, which may also be of ornamental design, and has an opening through which the post $f$ passes.

The frame $b\ b'\ b^2$, that supports the operative parts of the apparatus, is inserted through the lower end of the shell $a$, the pan $g$ and pointer and screw $r^3$ being then removed, and is fastened in the said shell by screws $b^6$. (See Fig. 3.)

I claim—

1. The combination of the frame $b\ b'\ b^2$ with the levers pivoted on said frame and the weight-supporting upright pivotally connected with said levers, and a spring and supporting-upright therefor connected with the lower member, $b^2$, of said frame, the said supporting-upright passing through and being attached to the upper end of said spring, which is embraced within and connected at its lower end with the said weight-supporting upright, the pointer-arbor having its bearings in the front member, $b'$, of said frame and provided with a pinion, and a rack meshing with said pinion connected with one of the levers with which the weight-supporting upright is connected, substantially as described.

2. The combination of the pointer-arbor of a weighing apparatus, said arbor having a pinion fixed thereon, and also having a threaded portion with a conical sleeve screwed upon said threaded portion, the pointer and hub therefor having a conical socket engaging said sleeve, and a spring that presses the said hub against the said sleeve, and a screw fastened to said arbor and supporting the end of said spring, substantially as described.

3. The combination of the frame $b\ b'\ b^2$, the levers pivoted thereon, and weight-supporting upright pivotally connected with said levers and the spring, with an independent case or shell inclosing said frame and detachably connected therewith, the operative parts being all supported independently of said detachable shell, substantially as described.

4. The combination of the frame, the levers pivotally connected therewith, and weight-supporting upright pivotally connected with said levers, and the counterbalancing-spring, with a pointer-arbor having a bearing in said frame and provided with a pinion and pointer frictionally held thereon, a rack engaging said pinion and connected with one of said levers, and a clamp for said pointer-arbor, consisting of a lever fulcrumed on said frame and having one arm that engages the end of said pinion and arbor to clamp the same against the frame-work while the pointer is being turned thereon, substantially as and for the purpose set forth.

5. The combination of the frame, the weight-supporting spring, and the pointer-arbor of a spring-balance connected therewith, with an inclosing-case having a lateral projection that receives the dial, and a detachable enlarging ring connected with said projection and having a flange overlapping said ring, and fastenings passing through the said flange of the dial and ring into the inclosing-case, substantially as and for the purpose described.

In testimony whereof I have signed my name to this specification in the presence of two subscribing witnesses.

JNO. H. NOLAN.

Witnesses:
JOS. P. LIVERMORE,
M. E. HILL.